United States Patent
Van Zijp

[15] 3,683,598
[45] Aug. 15, 1972

[54] CLOSING SPINDLE FOR BOTTLE SEALING AND OPENING MACHINES

[72] Inventor: Tonny Van Zijp, 10, Pieter Both-straat, Leiden, Netherlands

[73] Assignee: N. V. Leidsche Apparatenfabrick, Leiden, Netherlands

[22] Filed: Aug. 13, 1970

[21] Appl. No.: 63,391

[30] Foreign Application Priority Data

Aug. 14, 1969    Netherlands..............6912392

[52] U.S. Cl....................................53/331.5, 53/317
[51] Int. Cl...........................B67b 3/08, B65b 7/28
[58] Field of Search............................53/317, 331.5

[56] References Cited

UNITED STATES PATENTS

| | | |
|---|---|---|
| 2,559,358 | 7/1951 | Hullhorst et al..........53/331.5 |
| 2,684,141 | 7/1954 | Pim...........................53/317 X |
| 2,991,607 | 7/1961 | Menheneott...........53/331.5 X |
| 3,031,822 | 5/1962 | Dimond................53/331.5 X |

Primary Examiner—Travis S. McGehee
Attorney—Fleit, Gipple & Jacobson

[57] ABSTRACT

A closing spindle for a bottle sealing and opening machine, comprising a spindle rotating about a vertical shaft and being mounted in a bottle turn-table. The spindle has at its lower end a tightening chuck in which a cap fits tightly. The spindle is arranged to have a positively directed, vertical movement during rotation about the vertical shaft. An ejection spindle extends through a central bore of the closing spindle and is axially slidable with a length greater than the total length of the rotating closing spindle. The ejection spindle may be selectively held constantly pressed upwardly or downwardly relative to the rotating spindle. At some distance above the upper end of the ejection spindle a stop is provided rigidly mounted on the sealing machine to limit the vertical upward movement of the ejection spindle. The ejection spindle is provided at its lower end with an adjustable stop collar cooperating with the lower end of the rotating spindle in the tightening chuck to limit the vertical movement of the ejection spindle relative to the rotating spindle.

7 Claims, 2 Drawing Figures

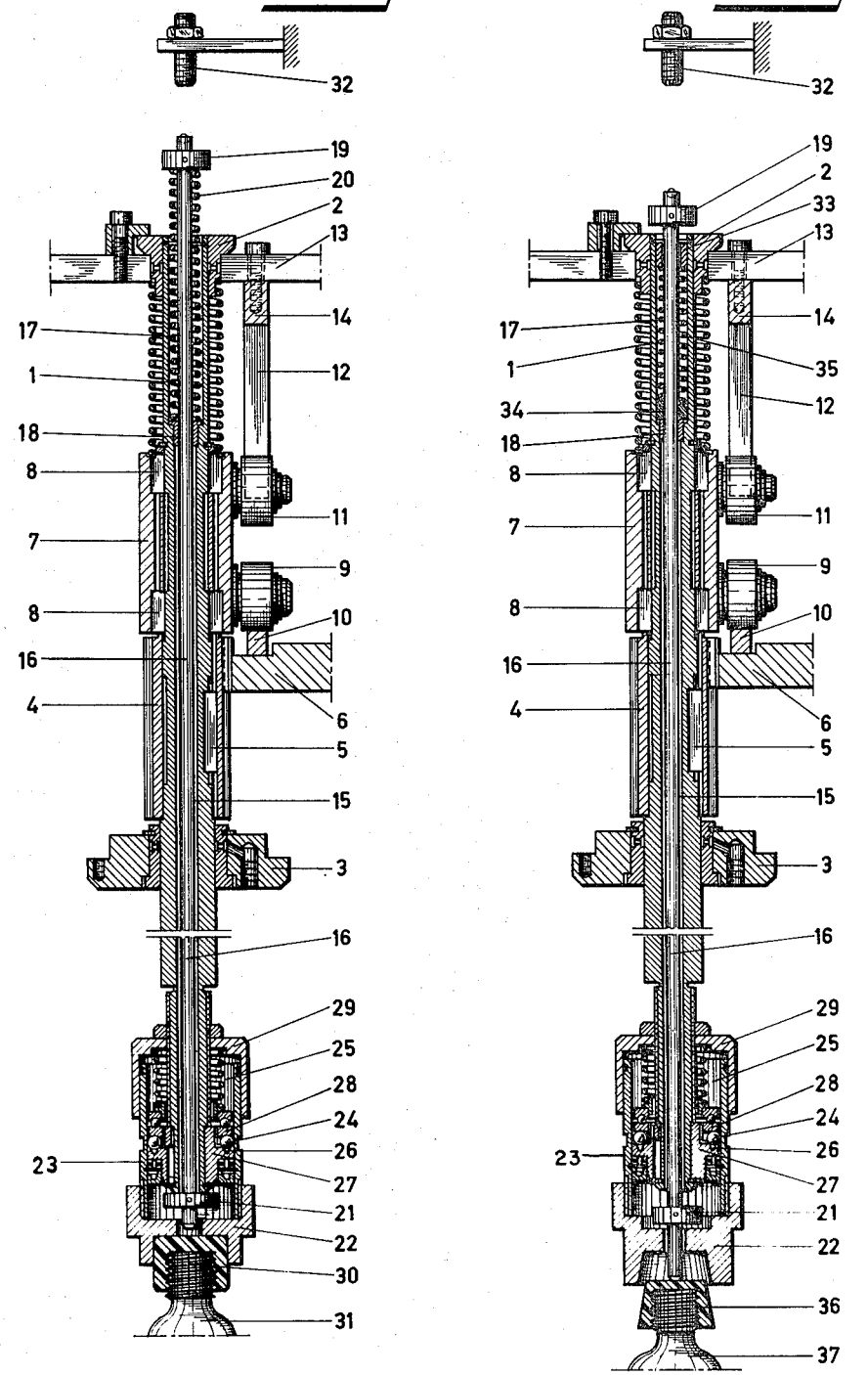

CLOSING SPINDLE FOR BOTTLE SEALING AND OPENING MACHINES

The present invention relates to a closing spindle for a bottle sealing and opening machine, comprising a spindle rotating about a vertical shaft and being mounted in a bottle turn-table, said spindle being provided at its lower end with a tightening chuck in which a cap fits tightly.

It is known to manufacture bottle sealing machines with high capacity in a so-called turn-table form, the sealing mechanism being manufactured in the form of a number of closing spindles which are provided along the periphery of a turn-table above the bottles provided in the turn-table, which bottles have to be capped. The closing spindles comprise at their lower end a tightening chuck manufactured so that a cap to be provided on the bottles fits tightly therein.

Dependent on the nature and the form of the bottle sealings to be provided, various kinds of closing spindles have been used up to now, in which the different spindles have a limited range of adaptability. A special demand is be made on a closing spindle used in a bottle sealing machine to which bottles are supplied which carry already the cap to be provided. This demand consists in that the spindle presses the cap into a flat and centric position on the bottle neck before the actual sealing movement is carried out, and consequently, specially constructed closing spindles are being used hitherto which differ from closing spindles used in bottle sealing machines which take the caps for the bottles from tables which remove the pre-selected caps from a storage and bring them to the bottle sealing machine, the spindles pressing the cap, located in their tightening chuck, onto the bottle during their sealing operation. Moreover, various spindles are used hitherto for applying screw caps and pressure caps.

Bottle opening and sealing machines are also manufactured in turn-table form and provided with opening spindles located along the periphery of the turn-table for removing sealings from return bottles. In general, the opening spindles differ not only from the closing spindles in bottle sealing machines but also among each other depending on the nature and the form of the sealings to be removed.

Differences in structures of the closing- and opening spindles known so far, due to the differences in the functions required, result in that the spindles have a limited range of adaptability. The disadvantage of this is that bottle sealing machines, which are used for providing bottles with a sealing of a certain nature or form e.g. for applying a screw cap which is supplied by the bottle itself) cannot be used for applying screw caps of a different nature and form or for applying pressure caps and that either a different sealing machine has to be used or that the closing spindles have to be replaced by other closing spindles of a different structure, which is a rather complicated action and takes a lot of time. Moreover, it is required to keep a number of different closing spindles in stock.

The object of the present invention is to avoid the above-mentioned disadvantages and to provide a closing spindle which can be used universally, i.e. which can be built-in without alterations both in bottle sealing machines and in bottle opening machines for any use.

In accordance with the invention, said object is achieved in that the spindle is provided with means which import a positively directed, vertical movement to the spindle during its rotation about a vertical shaft, that an ejection spindle extends through a central bore of the closing spindle, said ejection spindle being axially slidable and the length of said ejection spindle being greater than the total length of the rotating spindle, that means are present for holding the ejection spindle at choice in a constantly pressed upward or downward position relative to the rotating spindle, that at some distance above the upper end of the ejection spindle a stop is provided, being rigidly mounted on the sealing machine to limit the vertical upward movement of the ejection spindle, and that said ejection spindle is provided at its lower end with an adjustable stop collar cooperating with the lower end of the rotating spindle in the tightening chuck to limit the vertical movement of the ejection spindle relative to the rotating spindle.

The means for imparting a positively directed, vertical movement to the spindle during its rotation may give a combined rotating and up-and-down movement to the spindle, said movement being necessary for screwing a screw cap on the bottle or for unscrewing same cap.

The ejection spindle extending through the central bore may, in principle, follow said up-and-down movement through means which hold the ejection spindle in a constantly pressed upward and downward position relative to the rotating spindle.

However, the ejection spindle is limited in its upward movement by a stationary stop which is provided at the machine above the ejection spindle at a height so that during the upward movement of the closing spindle the ejection spindle moving in the same direction will contact said stop before the closing spindle has reached its uttermost position. In consequence thereof, a relative displacement in downward direction of the ejection spindle relative to the closing spindle takes place during the last part of the upward movement of the closing spindle, as a result of which the lower end of the closing spindle penetrates into the tightening chuck of the spindle and may eject a cap located therein from said chuck.

When the closing spindle has to be used in sealing machines, in which the caps are supplied by tables, from which tables the caps are taken by the closing spindles and in which the caps are subsequently provided on the bottles by the closing spindles, the ejection spindle has to be in upward position relative to the closing spindle during the sealing operation, as a result of which the ejection spindle does not extend into the tightening chuck. When the closing spindle, after the cap has been provided on the bottle, is moved upwardly, the tightening chuck will be lifted from the cap when the latter has been provided on a bottle. When there is no bottle under the closing spindle during the sealing operation, the cap will remain clamped in the tightening chuck and will be pushed out of the tightening chuck and removed during the last part of the upward movement of the closing spindle by the ejection spindle which strikes the stop lying above said ejection spindle.

The means for applying a constant upward pressure on the ejection spindle are also used with the closing spindles when these are used in opening machines, the driving mechanism being such that the closing spindle is rotated in a direction opposite to the one with sealing machines. With the downward movement the tightening chuck is clamped onto the cap, the ejection spindle being in elevated position relative to the closing spindle. With the upward movement the cap is unscrewed from the bottle. During the last part of the upward movement of the closing spindle, in which the cap has been removed from the bottle, the ejection spindle strikes the stop and the cap is pushed out of the tightening chuck.

In accordance with the invention, the closing spindle may be used also with sealing machines, in which machines the sealings are taken directly from the storage by the bottle. The closing spindle is provided with means for applying a constant downward pressure on the ejection spindle. During the downward movement of the closing spindle, the ejection spindle will apply first a centric pressure on the sealing before said sealing will be clamped in the tightening chuck, thus ensuring the right position of the sealing for screwing or pressing same onto the bottle neck. As the arriving bottle carries the sealing along no sealing will be present in the tightening chuck when there are no bottles and in that case the function of ejection will be omitted.

In accordance with the invention, a preferred embodiment of the closing and opening spindles resp. is obtained in that the means for applying a constant downward or upward pressure on the ejection spindle consist of a spiral compression spring provided around the upper part of the ejection spindle in an enlarged part of the central bore of the rotating spindle, said spring extending between a stop provided on the inner wall of the enlarged part of the central bore and a stop provided on the periphery of the ejection spindle, the latter stop may be provided at choice at a distance below or above the first mentioned stop.

When the stop on the ejection spindle, which may consist of an adjustable stop collar, is located above the stop at the inner wall of the central bore of the closing spindle, the helical spring will apply an upward pressure on the ejection spindle relative to the closing spindle, while a stop collar, being provided on the underside of the ejection spindle, will take care that the ejection spindle will not be pressed too far in upward direction. In this embodiment the spindle is used in opening and sealing machines, in which the sealings are provided by tables. When the stop on the ejection spindle is provided below the stop on the inner wall of the central bore of the closing spindle, the helical spring will apply a constant downward pressure on the ejection spindle and in this embodiment the closing spindle will be applied in sealing machines in which the sealings will be supplied by the bottles themselves.

Another embodiment in accordance with the invention is obtained in that a collar sleeve is provided in the enlarged part of the central bore, the collar of said sleeve lying on the shoulder which is formed in the central bore at the junction between the enlarged part of said bore and the remaining part having a smaller diameter, a fixed stop collar being provided at the upper end of the ejection spindle, the collar sleeve and the stop collar forming stops for a helical spring for applying a constant upward pressure on the ejection spindle while for applying a constant downward pressure on the ejection spindle, a stop collar will be provided in the upper end of the enlarged part of the central bore, said collar being removably attached to the inner wall thereof, as well as a stop collar at a distance below said collar at the periphery of the ejection, said collar being removably attached to said spindle, between which collars a helical spring will be provided.

A closing spindle in accordance with this embodiment can easily be applied in opening and sealing machines, in which the sealings are carried along by tables and for application in sealing machines, in which the sealings are carried along by the bottles themselves, only two additional stops for the helical spring have to be provided in the enlarged part of the central bore.

In accordance with the invention, an advantage embodiment of the means for applying vertical movement on the rotating closing spindle is obtained in that the means for vertical movement of the rotating spindle comprise a cylindrical body provided around the periphery of the spindle, in which body the spindle may rotate, said body being secured against axial displacement relative to the spindle and being provided at its periphery with a roller rotatable about a horizontal shaft, said roller cooperating with a cylindrical cam, which cam will run below said roller during the rotation of the spindle, and that means are present to prevent rotation of the body.

The roller is pressed onto the cam by a compression spring provided between the upper side of the cylindrical body and the under-side of the upper bearing of the closing spindle.

In accordance with the invention, the means for preventing rotation of the cylindrical body may comprise a second roller a attached to the periphery of the body and being rotatable about a horizontal shaft, said roller cooperating with a stationary guide means for said roller, said guide means extending in vertical direction along the spindle.

In accordance with the invention, a favorable embodiment of a closing spindle is also obtained in that the cam is provided on the upper side of a gear wheel provided below the cam roller and which gear wheel meshes with a pinion provided on the spindle for rotatably driving the rotating spindle.

The closing spindle in accordance with the invention may also be manufactured so that sealings of different forms and sizes may be provided with said spindle and according to the invention said object is achieved in that the tightening chuck is exchangeable and that said chuck is applied to the rotating spindle through a cylindrical casing, said casing being rotatably connected to said spindle through an adjustable disconnecting coupling.

The adjustable disconnecting coupling makes it possible to pre-set the degree of torque applied in tightening the cap so that the force with which the various caps are screwed on a bottle can be adjusted beforehand. When a certain torque has been reached, the disconnecting coupling comes into action and the cylindrical casing will begin to slip relative to the rotating spindle.

The invention will now be described more in detail with reference to the accompanying drawing which illustrates by way of example one embodiment of a closing spindle in accordance with the invention.

FIG. 1 is an embodiment of a closing spindle according to the invention, in which said spindle is applied in opening and sealing machines and in which the sealings are supplied by take-off tables.

FIG. 2 is an embodiment of the closing spindle according to FIG. 1, in which said spindle is applied in sealing machines in which bottle sealings are supplied by the bottles themselves.

In both figures corresponding parts are indicated with the same reference numbers. The closing and opening spindle (as shown) consists of a rotating spindle 1 being rotatably mounted in bearings 2 and 3, which bearings are rigidly mounted in a bottle turntable (now shown). A pinion 4 is provided on the periphery of spindle 1, said pinion being non-rotatably attached to the spindle through a key 5. The pinion 4 meshes with a gear wheel 6 which is driven in a manner not shown and which imparts a rotating movement — through pinion 4 — to the spindle 1.

The gear wheel 6 may rotate in one direction or the other. A cylindrical body 7 is provided above the pinion 4 around the periphery of spindle 1. The body 7 is connected to the spindle 1 through needle thrust bearings 8, so that the spindle 1 can rotate in the body, which is secured against axial displacement relative to the spindle 1. The body 7 is provided on the outer side with a cam roller 9 rotatable about a horizontal shaft, said roller cooperating with a cam 10 which is mounted on the upper side of the gear wheel 6 and which is formed in a manner that during the rotating movement of the gear wheel 6 a downward and upward movement is given to the body 7 — and through said body to the spindle 1 — from a starting position. Moreover, a second roller 11 is provided at the outer casing of the body 7, said roller being rotatable about a horizontal shaft and running in a vertical guide 12, which guide is mounted in a guide plate 14 being rigidly attached to the upper bearing plate 13 of the closing spindle. The guide roller 11 secures the body 7 against rotation.

The closing spindle 1 comprises a central bore 15 through which passes an ejection spindle 16, which spindle 16 extends beyond the upper and underside of the spindle 1. Moreover, the central bore 15 comprises at the upper side an enlarged part 17. A collar sleeve 18 is provided at the junction between the enlarged part 17 of the central bore 15 and the remaining part, the collar of said sleeve lying on the shoulder which is located in the region in the central bore. The ejection spindle 16 is provided at this upper end with an adjustable stop collar 19.

FIG. 1 illustrates a spiral compression spring 20, which bears with its end against the collar sleeve 18 and the stop 19 resp. The helical spring 20 applies a constant upward pressure relative to the rotating spindle 1 to the ejection spindle 16. The ejection spindle is provided at its lower side with an adjustable stop collar 21, said collar taking care that the ejection spindle 16 will not be pressed too far in upward direction. The rotating spindle is provided at its underside with a tightening chuck 22, said chuck being screwed on a cylindrical sleeve 23, said sleeve being rotatably mounted on the underside of the spindle. The sleeve 23 is provided in its interior with a circular ball bearing cage containing balls 24 which are pressed into cavities 26 by compression springs 25, said cavities being provided in a hub 27, said hub being mounted against rotation on the spindle 1. A thrust bearing 28 in the form of a ball bearing is provided between compression springs 25 and balls 24. The pressure applied by the compression springs may be adjusted by means of an adjustable ring 29. The balls 24 are pressed into the cavities 26 under the influence of the pressure exerted by the springs 25, as a result of which said balls will rotate with the rotating spindle 1, as a consequence of which the sleeve 23 and the screw head 22 screwed on said sleeve will be rotated through the ball bearing cage. When a certain torque has been reached, which is set by means of the adjustable hold-down springs 25, the balls 24 will be pushed out of their cavities 26 and will roll over the surface of the ring 27, as a result of which the sleeve 23 will stop rotating with the spindle. The tightening torque on screw head 22 can be set by means of said adjustable disconnecting coupling and when the degree of said torque is exceeded, only a small residual torque will remain.

FIG. 1 illustrates the closing spindle applied in a sealing machine, in which the cap 39 to be provided has been clamped in the tightening chuck beforehand. In the illustrated embodiment the closing spindle is located above the bottle 31 to be sealed. Starting from the given situation the spindle 1 is set rotating through gear wheel 6 and pinion 4, the cam roller 9 rolling along the cam 10 so that the spindle 1 is moved down and the cap 30 will then be screwed onto the neck of bottle 31. When the cap 30 has been screwed into sealing position as desired, the disconnecting coupling (24, 25, 26) comes into operation, as a result of which the tightening chuck 22 will not participate anymore in the rotating movement of the spindle. In addition, the spindle will be moved in upward direction at that moment through cam roller 9, cam 10 and body 7, and the ejection spindle 16 is moved also in upward direction under the influence of the helical spring 20. However, the upward movement of the ejection spindle 16 is limited by a stationary stop 32 which is secured to the turn-table at a distance above the ejection spindle 16.

The stop 32 is located at a distance above the ejection spindle 16 so that said ejection spindle will strike the stop when the tightening chuck lies above the bottle 31.

When the ejection spindle strikes the stop 32, said spindle will move relative to the rotating spindle 1 in downward direction, as a result of which the ejection spindle will slide into the tightening chuck 22 and will eject a cap if same is still present in the chuck (in case there was no bottle during the sealing movement of the spindle).

FIG. 2 illustrates the same closing spindle as FIG. 1, however, the spindle is now adapted for application in a sealing machine, in which the caps are supplied by the bottles themselves. With this application, a stop collar is provided at the upper side of the enlarged part 17 of the central bore 15, said stop collar bearing against a plate which is rigidly mounted on the upper side of the central bore. Moreover, a stop collar 4 is provided on the ejection spindle 16 at some distance below the stop collar 33. A spiral compression spring 35 is provided between the collars 33 and 34, said spring will apply a constant downward pressure to the ejector spindle 16 relative to the rotating spindle 1. In the starting position (shown in FIG. 2) the ejection spindle 16 extends in the tightening chuck 22 under the influence of the helical spring 35 and pushes against the cap 36 which is located on the bottle 37. During the downward movement of the closing spindle — which takes place in the same manner as illustrated in FIG. 1 — the cap will be pressed in a centric and flat manner onto the bottle 37 by the ejection spindle 16 before tb actual sealing operation begins. With the embodiment according to FIG. 2 the same movements take place as illustrated in FIG. 1. The caps may be clamped in the tightening chucks of the closing spindles by means of known elements, such as e.g. by clamping balls provided in the side wall of the tightening chuck.

In the embodiment according to FIG. 1 the closing spindle may be used in bottle opening machines, in which only provisions have to be made for reversing the direction of rotation of the spindle, which may be effected e.g. by providing an intermediate gear.

I claim:

1. A closing spindle for use with a bottle sealing and opening machine having a bottle turn-table, said closing spindle comprising a vertical shaft mounted in said bottle turn-table, a spindle having a central bore and positioned to rotate about said vertical shaft, a tightening chuck into which a bottle cap fits tightly provided at a lower end of said rotating spindle, means cooperating with said rotating spindle to impart vertical movement to the rotating spindle during its rotation about said vertical shaft, an ejection spindle extending through the central bore of said rotating spindle, said ejection spindle being axially slidable and the length of said ejection spindle being greater than the total length of said rotating spindle, means cooperating with said ejection spindle for selectively holding the ejection spindle either in a constantly pressed upward or downward position relative to the rotating spindle, a first stop rigidly mounted on the sealing machine and positioned above an upper end of the ejection spindle to limit the vertical upward movement of said ejection spindle, and a first adjustable stop collar positioned adjacent the lower end of said ejection spindle and cooperating with the lower end of said rotating spindle in the chuck to limit the vertical downward movement of said ejection spindle relative to said rotating spindle when said holding means holds said ejection spindle in a downward position to center caps on bottles to be capped.

2. A closing spindle according to claim 1 wherein said central bore includes an enlarged portion defining an inner wall and wherein said holding means comprises a spiral compression spring, said spring being located around the upper part of the ejection spindle in said enlarged portion of the central bore, a second stop provided on the inner wall of the enlarged portion of the central bore, a third stop provided on the periphery of the ejection spindle and spaced from said second stop, said spring extending between said second and third stops.

3. A closing spindle according to claim 2 further including a collar sleeve provided in the enlarged part of the central bore, a shoulder formed in the central bore at the junction between the enlarged part of said bore and the remaining part having a smaller diameter, the collar of said sleeve lying on said shoulder a second stationary stop collar provided at the upper end of the ejection spindle, the collar sleeve and the second stationary stop collar forming stops, a first helical spring cooperating with said collar sleeve and said second stationary stop collar for applying a constant upward pressure on the ejection spindle, and a third stop collar provided in the upper end of the enlarged part of the central bore, said third stop collar being removably attached to the inner wall thereof, and a fourth stop collar located a distance below said third stop collar at the periphery of the ejection spindle and removably attached to said ejection spindle, and a second helical spring positioned between said third and fourth stop collars.

4. A closing spindle according to claim 1 wherein the means for imparting vertical movement to the rotating spindle comprises a cylindrical body provided around the periphery of the rotating spindle and in which body the rotating spindle may rotate, said body being secured against axial displacement relative to the rotating spindle, a first horizontal shaft, a first roller rotatable about said horizontal shaft and located at the periphery of said body, a cylindrical cam cooperating with said roller so that said cam will run below said roller during the rotation of the rotating spindle, and means cooperating with said body to prevent rotation of the body.

5. A closing spindle according to claim 4 wherein the means for preventing rotation of the body provided with a cam roller comprises a second roller attached to the periphery of the body and rotatable about a second horizontal shaft, a stationary guide means cooperating with said second roller, said guide means extending in vertical direction along the closing spindle.

6. A closing spindle according to claim 4 further including a gear wheel, said cam being provided on the upper side of said gear wheel, said wheel being provided below the cam roller, and a pinion located for meshing with the gear wheel and for rotatably driving the rotating spindle.

7. A closing spindle according to claim 1 further including a cylindrical casing, and an adjustable disconnecting coupling the tightening chuck being exchangeable and said chuck being applied to the rotating spindle through said cylindrical casing, said casing being rotatably connected to said closing spindle via said adjustable disconnecting coupling.

* * * * *